United States Patent [19]
Anderson

[11] Patent Number: 5,429,462
[45] Date of Patent: Jul. 4, 1995

[54] VARIABLE PIVOT LOAD BINDER

[76] Inventor: Rick Anderson, 35 Margrave Ct., Walnut Creek, Calif. 94596

[21] Appl. No.: 206,012

[22] Filed: Mar. 4, 1994

[51] Int. Cl.⁶ .............................................. B65D 63/00
[52] U.S. Cl. ................... 410/100; 24/68 CT; 24/68 CD
[58] Field of Search ............ 410/10, 11, 12, 100, 410/103; 74/543, 544, 545, 546, 547; 24/68 CT, 68 CD, 69 CT, 69 T

[56] References Cited

U.S. PATENT DOCUMENTS

| | | | |
|---|---|---|---|
| 2,746,108 | 5/1956 | Cole et al. | 24/68 CT |
| 2,947,514 | 8/1960 | Goss | 410/100 X |
| 3,426,996 | 2/1969 | Broling | 248/361 |
| 3,657,944 | 4/1972 | Able | 74/544 |
| 4,358,232 | 11/1982 | Griffith | 410/100 |
| 4,422,218 | 12/1983 | Brasseux | 24/68 CT |
| 4,756,181 | 7/1988 | Appelgren | 74/544 X |
| 4,977,646 | 12/1990 | McCraw | 24/68 CT |

OTHER PUBLICATIONS

Product Brochure, The Crosby Group, Inc., *General Catalog*, Jan. 1987, pp. 54-55.

*Primary Examiner*—Michael S. Huppert
*Assistant Examiner*—James Eller
*Attorney, Agent, or Firm*—Schneck & McHugh

[57] ABSTRACT

A load binder with incremental adjustments that can adjust a load to within one quarter of one link, having a handle that extends into a curved cam with a recess, and a many sided variable pivot mounted within the recess and two opposed clevises attached to the cam. The incremental adjustments are made available by mounting the variable pivot asymmetrically about its axis. Providing the incremental adjustments abrogates the over or under tensioning of a link chain that has been historically associated with the lever type load binders.

3 Claims, 3 Drawing Sheets

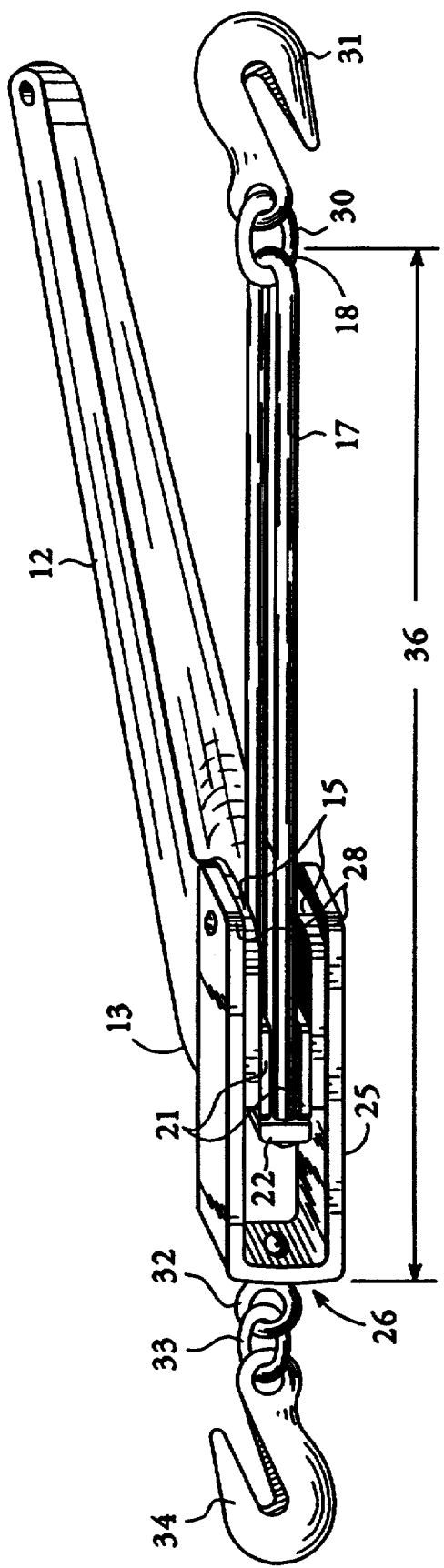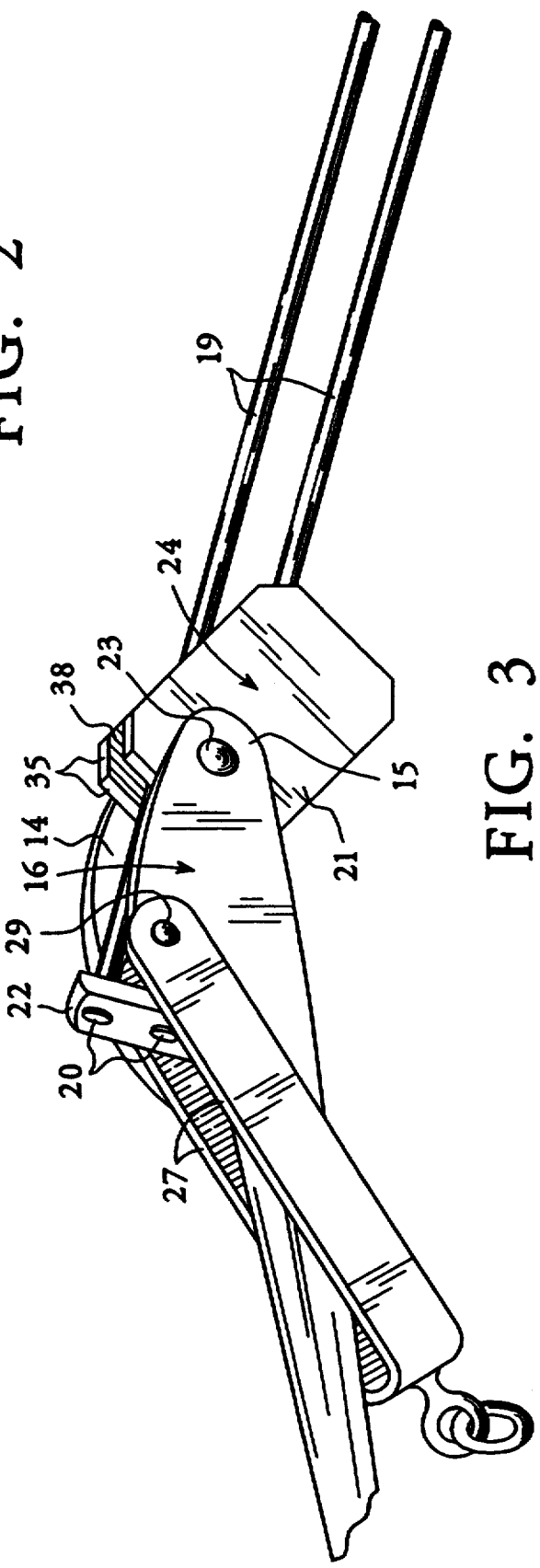

VARIABLE PIVOT LOAD BINDER

TECHNICAL FIELD

The present invention pertains to load binders. Specifically, the present invention pertains to a lever type load binder ideally suited for chain tensioning.

BACKGROUND ART

Load binders are well known in the field of transportation, trucking in particular. Generally, they are manually operated tools used to remove slack from link chain securing loads to flat bed trucks, semitrailers and the like. In practice, opposed ends of a chain are fastened to separate ends of the load binder. Once attached, the chain will have residual slack. The slack is removed by contracting the length of the load binder thereby creating a tension between the two loads associated with each end of the chain. Conversely, when it is desired to release the tension, the load binder may again be extended.

Two well known designs for contracting and extending a load binder include the standard lever type and the ratchet binder type. The lever type has a preset length in the contracted position and does not allow for incremental adjustments in the length. Without the opportunity to make incremental adjustments in the length, a chain is often either too tight or too loose, which can compromise the tensioning effect of the load binder and create a danger of losing the load upon an abrupt change in movement. In addition to creating a danger of losing a load, this design poses several safety risks to the user.

First, the contracted length of the load binder can be too short which results in greater tensioning of the chain than required. As the lever is pressed to a locked position, the tension created produces potential energy that is transmitted to the lever which can result in the lever snapping against the load binder or link chain. This can catch a user's fingers causing serious injury. Further, when lifting the lever to expand the load binder's length, the release of this potential energy can result in the lever flying open and striking the unsuspecting user.

The ratchet binder overcomes many of the deficiencies of the standard lever type load binder. However, it also poses some drawbacks. The standard ratchet binder uses a series of gears and threads to extend and contract it. Although this allows for incremental adjustments in the tension, it creates a rotational movement along the axis of the connection between the binder and the link chain. The rotational movement twists the link chain. The torque forces that result from the twisting action weakens and wears the link chain. Further, the threads and gears require constant lubrication, and it has been discovered that the threads wear quickly. Finally, because of the complexity of the design, the ratchet binder is much more expensive that the standard lever type.

Therefore, it is the object of this invention to provide a lever type load binder that allows for incremental adjustment in the tension applied to a load while abrogating the safety risks historically associated with the standard lever type.

SUMMARY OF THE INVENTION

This object has been achieved by having a lever type load binder that can adjust a load to within one quarter of one link. This has been accomplished by having a handle that extends into a curved cam with a recess, mounting a many sided variable pivot within the recess and attaching two opposed clevises to the cam. Providing the incremental adjustments abrogates the over or under tensioning of a link chain.

The incremental adjustments are made available by mounting the variable pivot asymmetric about its axis. The lever functions to prevent the movement of the variable pivot by pressing against one of its sides. Thus, the present invention provides adjustments to within one quarter of one link, similar to the ratchet binders, but without the use of gears or threads, while abrogating the safety risks posed by traditional lever type load binders.

BRIEF DESCRIPTION OF THE DRAWINGS

FIG. 2 is a perspective view of the present invention shown in a position ready for use in tensioning link chain.

FIG. 3 is a perspective view of the device in FIG. 2 showing the lever extended to a fully open position.

BEST MODE FOR CARRYING OUT THE INVENTION

Figure 1:
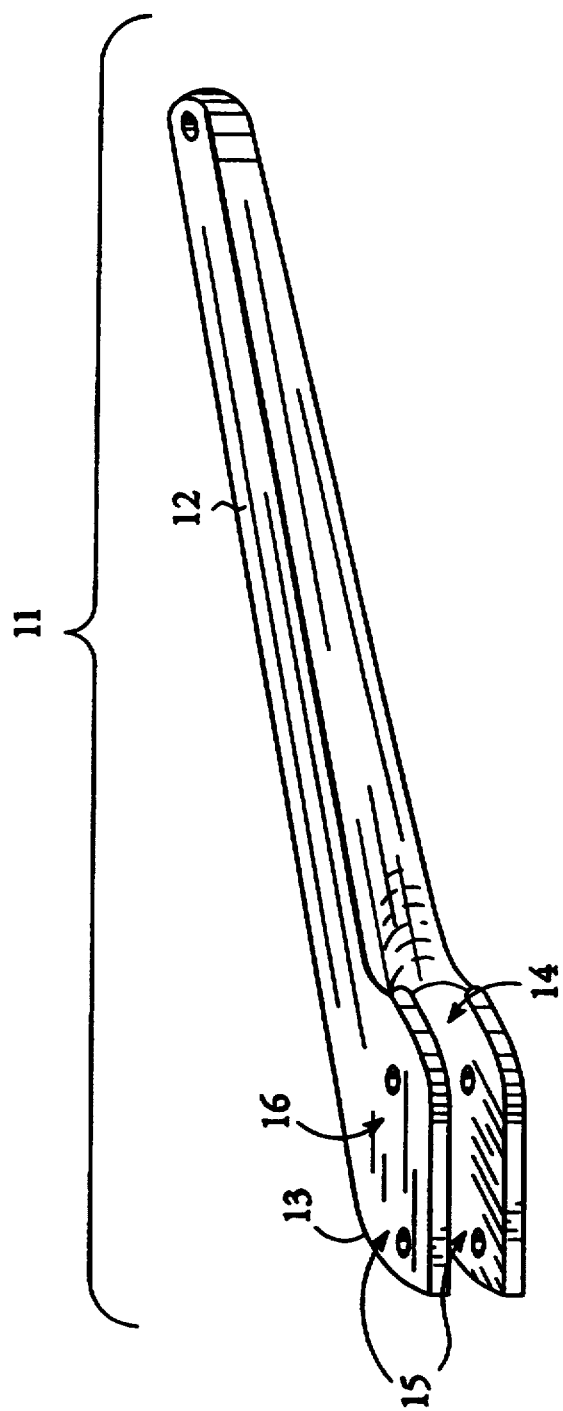
FIG. 1 is a perspective view of the lever in the present invention.
Figure 4:
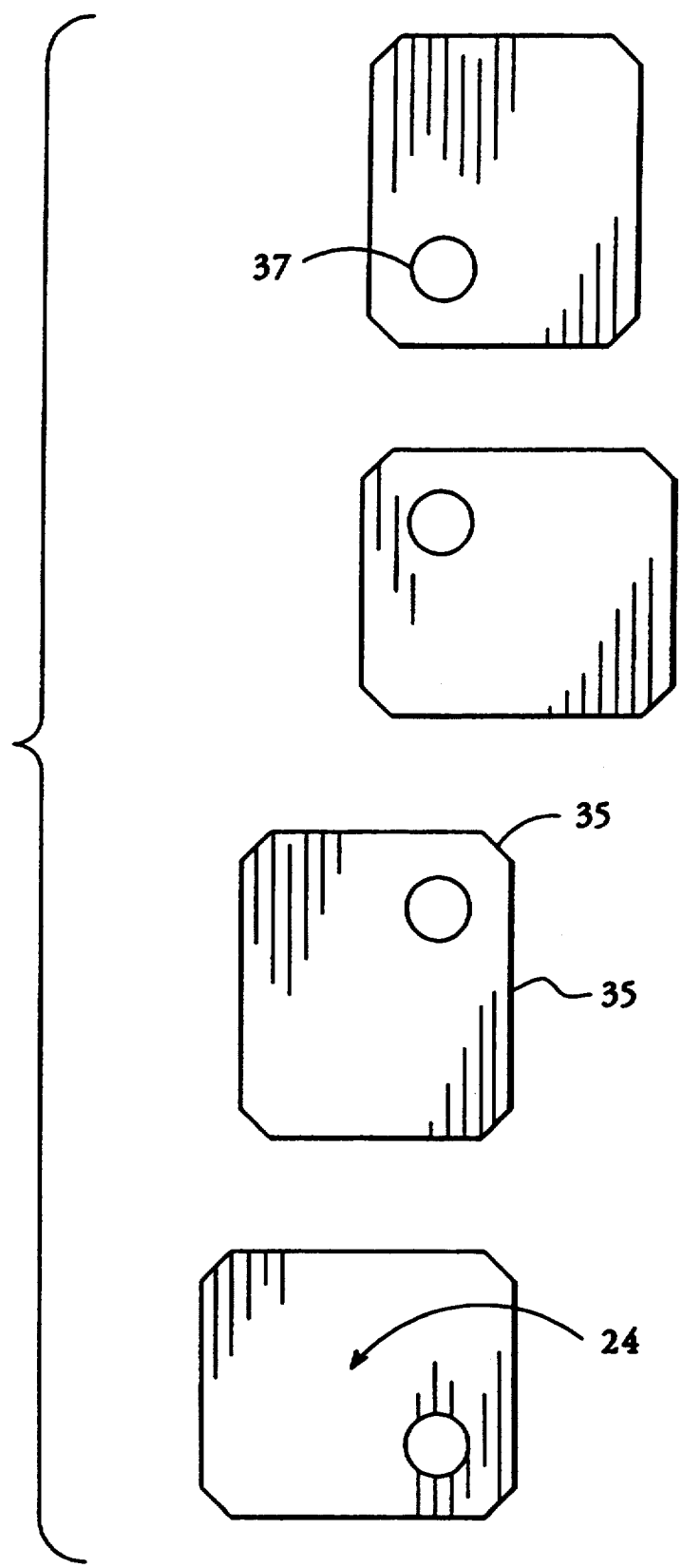
FIG. 4 is a perspective view of the variable pivot shown in FIGS. 2 and 3.

With reference to FIG. 1, a perspective view of the lever is shown. The lever (11) has a handle (12) and a curved cam (13) following the handle and integrally molded thereto. The curved cam (13) has a recess (14), two, spaced-apart, parallel end portions (15) and a nadir (16) positioned between the end portions (15) and the handle (12).

Referring to both FIGS. 2 and 3, a first clevis (17), which is substantially cylindrical in design, has a "U" portion (18) with two spaced-apart and parallel fork members (19) that terminate in two ends (20) opposite the "U" portion (18). The first clevis (17) is fitted into a recess (38) of an eight sided variable pivot (21) and slidably engaged thereto. Four sides of the variable pivot are of equal length and are substantially longer than the four remaining sides. Each of the four shorter sides are of equal length and positioned between two of the longer sides. The variable pivot has a hole (37) asymmetrically bored about its center axis (24), as shown in FIG. 3. Both the first clevis (17) and the variable pivot (21) are rotatably and slidably mounted in the recess (14) via a pin (23). The pin (23) is inserted through a hole in the end portions (15) so that it passes through both the variable pivot (21) and the fork members (19). An end-plate (22) is fastened over the ends (20) of the fork members (19) so that the variable pivot (21) is positioned between the end-plate (22) and the "U" portion (18) to keep the clevis (17) securely fastened within the recess (14).

A second clevis (25), of substantially planar design, has a "U" portion (26) and two spaced-apart, parallel fork members (27) that terminate in two ends (28) opposite the "U" portion (26). Each of the ends (28) are placed on either side of the cam (13) so that the second clevis (25) is rotatably connected to the nadir (16) of the cam (13) via a pin (29) inserted through the holes of both the nadir and the ends (28). The second clevis (25) is positioned so that the "U" portion (26) is on the side of the lever (11) opposite the recess (14).

To facilitate fastening the load binder to different loads, various hook combinations may be used. FIG. 2 shows the first clevis (17) having a link of a chain (30) connected at the "U" portion (18) with an eye grab hook (31) attached thereto. The second clevis (25) is shown with a round eye swivel (32) attached to the "U" portion (26). The round eye swivel (32) connects to an eye grab hook (34) via one link of chain (33).

In application, the lever is lifted to allow the variable pivot (21) to rotate and the first clevis (17) to move freely to an extended position. A separate load is fastened at each end of load binder via the eye grab hooks (31 and 34).

The pivot (21) is rotated so that the proper contracted length of the load binder is obtained. The distance of contraction is determined by the distance between the pin (23) and the side (35) of the variable pivot (21) that seats against the end-plate (22).

The load binder is contracted by pressing the handle (12) of the lever (11) so that it rests against the first clevis (17). The curved cam (13) causes the pivot (21) to bind against the end-plate (22) thereby contracting the overall length (36) of the load binder. The curved cam (13) also prohibits the movement of the pivot (21) by binding downward against it.

I claim:

1. A load binder comprising:
   a first clevis means, including a first load end, for attaching to a load, said first clevis means having an end-plate opposite said load end, a second clevis means, including a second load end, for attaching to a second load, said second clevis means having two, spaced apart, parallel ends opposite said load end, said first clevis means and said second clevis means lying in a plane with said first load end facing a direction opposite said second load end thereby defining a length across which tension is to be maintained,
   a lever means for preventing a movement of a pivot means, said lever means including a handle and a curved cam following said handle, said curved cam having two, spaced-apart, parallel end portions and a nadir further defining a recess, said ends of said second clevis means rotatably engaging said cam at said nadir, said pivot means, mounted between said two, spaced-apart, parallel end portions, whose position is variable, for increasing and contracting said length by engaging said end-plate, said pivot means having a center axis,
   a cross member within said recess extending perpendicular to said handle between said end portions, said pivot means rotatably engaging said cross member asymmetrically about said axis, said first clevis means rotatably and slidably engaging said cross member with said pivot means being between said end-plate and said first load end.

2. A load binder comprising:
   a first clevis means, including a first "U" portion, for attaching to a load, said first clevis means having an end-plate opposite said "U" portion, a second clevis means, including a second "U" portion for attaching to a second load, said second clevis means having two, spaced-apart, parallel ends opposite said "U" portion, said first clevis means and said second clevis means lying in a plane with said first "U" portion facing a direction opposite said second "U" portion thereby defining a length across which tension is to be maintained,
   a lever means for preventing a movement of a pivot means having, integrally formed therewith, a handle and a curved cam following said handle, said curved cam having two, spaced-apart, parallel end portions and a nadir further defining a recess, said ends of said second clevis means rotatably engaging with said cam at said nadir, said pivot means, mounted between said two, spaced-apart, parallel end portions, whose position is variable, for increasing and contracting said length by engaging said end-plate, said pivot means having a center axis and a plurality of sides,
   a cross member within said recess extending perpendicular to said handle between said end portions, said pivot means rotatably engaging said cross member asymmetrically about said axis, said first clevis means rotatably and slidably engaging said cross member with said pivot means being between said end-plate and said first "U" portion.

3. A load binder comprising:
   a first clevis means, including a first "U" portion, for attaching to a first load, said first clevis means having two, spaced-apart, parallel fork members with said first "U" portion and said fork members being substantially cylindrical in shape, each of said fork members having an end opposite said first "U" portion, an end-plate rigidly connected to said ends of said fork members, said first "U" portion having a means for attaching to link chain, a second clevis means for attaching to a load having a second "U" portion and two, spaced-apart, parallel fork members with said second "U" portion and said fork members being substantially planar in shape, said second "U" portion having a means for attaching to link chain, each of said fork members of said second clevis means having an end opposite said second "U" portion, each of said ends of said fork members of said second clevis means having a hole, said first clevis means and said second clevis means lying in a plane with said first "U" portion facing a direction opposite said second "U" portion thereby defining a length across which tension is to be maintained,
   a lever means for preventing a movement of a pivot means having, integrally formed thereto, a handle and a curved cam following said handle, said curved cam having two, spaced apart, parallel end portions and a nadir further defining a recess, said ends of said second clevis means rotatably engaging said cam at said nadir, said pivot means, mounted between said two, spaced-apart, parallel end portions, whose position is variable, for increasing and contracting said length by engaging said end-plate, said pivot means comprising an octagonal block having four of the eight sides of equal length and substantially longer than the four remaining sides, each of said four remaining sides being of equal length and positioned between two of said longer sides, said pivot means having a center axis and a hole asymmetrically positioned about said axis,
   a cross member within said recess extending perpendicular to said handle at said end portions, said pivot means rotatably engaging said cross member asymmetrically about said axis, said first clevis means rotatably and slidably engaging said cross member with said pivot means being between said end-plate and said first "U" portion.

* * * * *